United States Patent
Kumar

(10) Patent No.: US 11,194,670 B2
(45) Date of Patent: Dec. 7, 2021

(54) SYNTHESIZING FULLY HYDRATED CLOUD SNAPSHOTS

(71) Applicant: EMC IP Holding Company LLC, Hopkinton, MA (US)

(72) Inventor: Sunil Kumar, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 584 days.

(21) Appl. No.: 16/054,018

(22) Filed: Aug. 3, 2018

(65) Prior Publication Data
US 2020/0042404 A1    Feb. 6, 2020

(51) Int. Cl.
G06F 16/11    (2019.01)
G06F 11/14    (2006.01)

(52) U.S. Cl.
CPC ........ *G06F 11/1464* (2013.01); *G06F 16/128* (2019.01)

(58) Field of Classification Search
None
See application file for complete search history.

(56) References Cited

U.S. PATENT DOCUMENTS

| 10,931,750 | B1* | 2/2021 | Labovich | H04L 67/1095 |
| 2017/0337109 | A1* | 11/2017 | Ramu | G06F 11/1448 |
| 2019/0065322 | A1* | 2/2019 | Chakankar | G06F 3/0689 |

* cited by examiner

*Primary Examiner* — Scott A. Waldron
(74) *Attorney, Agent, or Firm* — Workman Nydegger

(57) ABSTRACT

Systems and methods for synthesizing cloud snapshots of production data. A client system includes data and snapshots may be taken of that data. These snapshots are transferred to the cloud and hydrated to block devices that are similar to the devices on which the production data exists. Snapshots are then taken of the block devices. The cloud snapshots are the same as and correspond to the locally generated snapshots.

19 Claims, 2 Drawing Sheets

SYNTHESIZING FULLY HYDRATED CLOUD SNAPSHOTS

FIELD OF THE INVENTION

Embodiments of the present invention relate to systems and methods for performing data protection operations. More specifically, embodiments of the invention relate to systems and methods for synthesizing fully hydrated cloud snapshots.

BACKGROUND

Because data and applications are a crucial component of computing systems, failing to protect the data and applications is foolish. Consequently, data protection systems are used in many computer systems. However, the amount of data that needs to be protected is constantly increasing. Many entities are looking for less expensive storage, such as public storage options including AWS S3. Using these types of storage options allows vast amounts of data that is not used or that is primarily inactive to be offloaded to these storage options, which are often cloud based options.

The data stored in this type of storage is usually stored in a proprietary format as objects. As a result, these objects do not have any meaningful use in the cloud. These objects essentially serve as a vault to store backup data such that, when the need arises, the data can be restored to a primary storage system. Systems and methods are needed to improve the utility of data stored in the cloud.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the invention relate to systems and methods for protecting data. Protecting data may include backup operations, restore operations, taking snapshots, generating hydrated volumes and snapshots, performing testing and/or development based on fully hydrated snapshots, or the like or combination thereof. Embodiments of the invention further relate to systems and methods for synthesizing fully hydrated cloud snapshots. These fully hydrated cloud snapshots are not, in one embodiment, archive or backup snapshots. Rather, fully hydrated snapshots are suitable for test purposes, development purposes, disaster recovery workloads, or the like or combination thereof.

As previously stated, cloud storage is often used to store backups as objects and the utility of these objects is typically limited. The primary use of these objects is to perform a restore operation when necessary. Embodiments of the invention improve the functioning of the computing system by improving the usefulness of cloud data.

More specifically, embodiments of the invention may create cloud snapshots that correspond to local array snapshots. The cloud snapshots may be used for additional services such as disaster recovery, test and development workloads. Embodiments of the invention may generate multiple cloud snapshots from local array snapshots fast and efficiently.

The approach includes using local array snapshots and block change data between multiple snapshots (e.g., between successive snapshots) to synthesize cloud snapshots that correspond to each of the local array snapshots. These cloud snapshots are fully hydrated and ready to use and contain all the application data in a native format.

Figure 1:
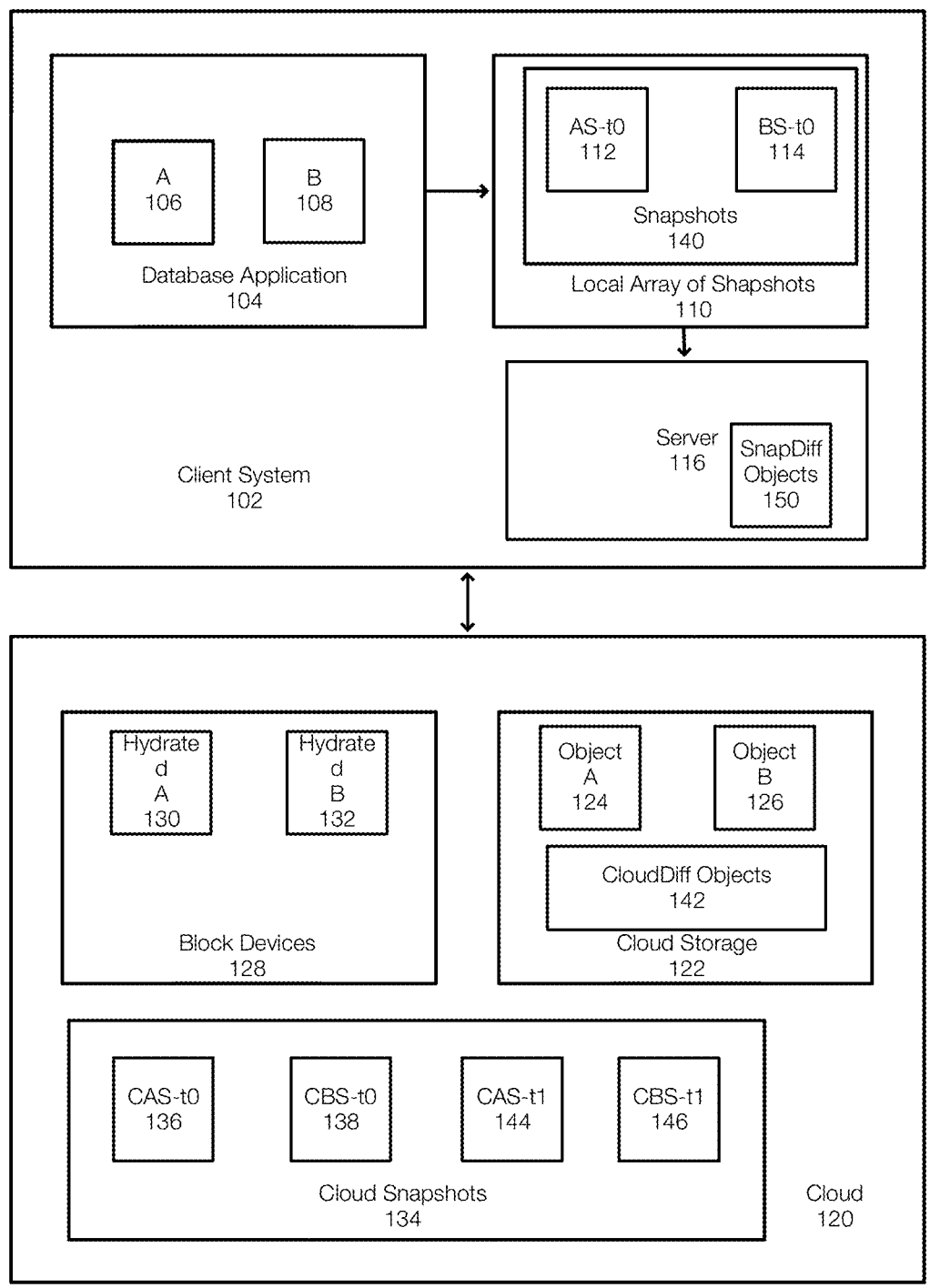
FIG. 1 is a block diagram of a computing system in which cloud snapshots are synthesized from local snapshots.

FIG. 1 illustrates an example of systems and methods for synthesizing multiple fully hydrated snapshots from local array snapshots. In one example, the cloud 120 may be implemented using features of Amazon Web Services. Embodiments of the invention may use Amazon Web Services. For example, Amazon Web Services may provide an import snapshot feature and may provide the hardware such as the storage devices.

FIG. 1 illustrates a client system 102 that communicates with a cloud 120 over a suitable connection. The client system 102 may include client computers, server computers, storage devices and other hardware needed to form connections and networks. The cloud 120 may be embodied as the Internet and may include datacenters or other storage, servers, and the like.

Embodiments of the invention may be used with any application. By way of example, however, FIG. 1 is discussed in the context of a database application 104, but embodiments of the invention include other applications and hardware configurations. The configurations disclosed herein contemplate real systems, virtual systems, or the like or combination thereof.

In this example, the client system 102 includes or is associated with a database application 104. The database application 104 is running in an on-premise environment in one example (e.g., a local computer system or local network).

In FIG. 1, the database application 104 may be stored on a volume array by way of example or other storage device. The database application 104 may store data on a volume A 106 and store log files on a volume B 108. Thus A 106 represents the data of the application 104 and B 108 represents the log files of the application 104.

The data A 106 and log B 106 may be backed up on a local array of snapshots 140. The snapshots 140 thus includes snapshots of the database application 104. Specifically, the snapshots 140 may include snapshots of A 106 and snapshots of B 108. Snapshots typically represent a point in time. In this example, the snapshot AS-t0 112 represents a snapshot of A 106 at time t0. The snapshot BS-t0 represents a snapshot of B 108 at time t0. Together, these constitute a snapshot of the database application 104 at time t0. The snapshots 140 may include other snapshots of A 106 and B 108 at different times. These are referenced, for example, as AS-t1 and BS-t1 or, more generally, as AS-tn and BS-tn. Thus, the snapshots 140 may include snapshots at times t0, t1, t2, ... tn.

FIG. 1 illustrates the database application 104 associated with a time t0. When the first local snapshot is triggered for this application 104 at time t0, snapshots of A 106 and B 108 are performed and stored, respectively, as AS-t0 112 and BS-t0 114. Generating cloud snapshots may begin after a snapshot is taken of the database application 104. The snapshots AS-t0 112 and BS-t0 114 are masked to a server 116 (e.g., a node configured to move data). The server 116 may be, for example a Linux Host connected to the underlying storage array either via FC or iSCSI. Thus, the server r 116 can communicate directly with the storage device or array in one example.

In one example, the server 116 converts the local snapshots AS-t0 112 and BS-t0 114 to raw disk image files and streams the disk image files to cloud storage 122 (e.g., a datacenter or other cloud storage such as Amazon S3 storage) in the cloud 120.

The server 116 may compress and/or encrypt the disk image files before transmission to reduce the volume of data transferred and to increase security. The disk image files of the snapshots AS-t0 and BS-t0 are thus transmitted to the cloud storage 122 and stored as object A 124 and object B 126. The objects A 124 and B 126 may have a proprietary format.

Next, the object A 124 and the object B 126 are decrypted and/or decompressed if necessary. Then, the object A 124 and the object B 126 are hydrated to block devices 128 as Hydrated A 130 and Hydrated B 132. The objects A 124 and B 126 may be hydrated to block devices or volumes whose sizes are equivalent to the volumes associated with A 106 and B 108.

The objects A 124 and B 126 are hydrated, for example, using a software tool that can read the data (bytes) from objects and write those bytes at an appropriate offset and blocks on the block devices 128. In one example, an import snapshot feature may be used to hydrate the disk images stored as object A 124 and object B 126 to the block devices 128.

After the objects A 124 and B 126 have been hydrated to the block devices 128, cloud snapshots 134 may be taken of the hydrated A 130 and the hydrated B 132. These cloud snapshots are illustrated as CAS-t0 136 and CBS-t0 138. Thus, the cloud snapshots CAS-t0 136 and CBS-t0 138 have the same data as, respectively, AS-t0 112 and BS-t0 114. Further, these snapshots correspond to the time t0 in this example.

The relationships are reflected in the following table after the first snapshot is taken at time t0.

| Local array Snap | Corresponding Cloud Snap | Time of Snap |
| --- | --- | --- |
| Snapshot AS - t0 | Snapshot CAS - t0 | t0 |
| Snapshot BS - t0 | Snapshot CBS - t0 | t0 |

Snapshots of the database application 104 will continue to be taken (e.g., at times t1 . . . tn. These snapshots may be associated with different times (t1, t2, etc.). However, transferring these subsequent snapshots to the cloud 120 does not require the server 116 to transfer the full snapshots. For example, the server 116 is not required to transport the entire snapshot AS-t1. Rather, the blocks that have changed or the difference between AS-t1 and AS-t0 are prepared and transmitted. These difference snapshots or snapdiffs are generated and are illustrated as snapdiff objects 150. The snapdiffs are examples subsequent snapshots. Thus, a subsequent snapshot includes changes that have occurred in the database application between backups or between snapshots. The changes can be derived from the snapshots and/or from a change log. The change log may identify changes as they occur in terms of size and/or location.

In one example, generating a snapdiff object may include querying (e.g., via API or CLI) the array 110 to obtain a snap difference, which identifies changed blocks. In one example, the snap difference may be represented as $AS_{t1}-AS_{t0}$ and $BS_{t1}-=BS_{t0}$ or, more generally, as $AS_{tx}-AS_{t(x-1)}$ and $BS_{tx}-=BS_{t(x-1)}$.

The changes between two snapshots (e.g., two time successive snapshots) can be captured in a meta data file, such as illustrated below.

"size":8192, "offset":0
"size":8192, "offset":4194304
"size":8192, "offset":4210688
S"size":16384, "offset":6291456
"size":8192, "offset": 6324224
"size":8192, "offset": 17973248
"size":3465216, "offset":130752512
"size":28229632, "offset":140509184

In the meta data file that identifies the changes between two snapshots, the size represents the length of data in bytes that was changed and the offset is a byte offset locating the change.

The meta data file (e.g., a change file or change log) is provided to or generated by the server 116. In the example, where time t0 is associated with a snapshot of an application (e.g., the snapshots AS 112 and BS 114), a metadata file may be generated based on the changes between the snapshot at time t1 and the snapshot at time t0. The server 116, using the meta data file, will access the snapshot AS-t1 and read the modified data block to create a snapdiff. In one example, the snapdiffs AS(t1-t0) and snapdiff BS(t1-t0) are obtained.

The changes read from the snapshots at time t1 in this example and the metadata file may be combined into a single file for transport to the cloud 120. For example, the format may be configured to separate the metadata portion and data portion and save all the meta data information at the top header of the. As a result, querying the metadata of the snapdiff will allow all changed blocks to be identified without having to scan through the entire file.

The format of a cloud snapdiff file may be as follows:
F:<From-snap-id>T:<To-snap-id>"size":8192, "offset":0","offsetInFile":xxxx,size":8192, "offset": 4194304

...........

<Data blocks at offsetInFile><Data blocks at offsetInFile><Data blocks at offsetInFile>

----

The snapdiff file or snapdiff objects 150 (e.g., snapdiff AS-t1 and snapdiff BS-t1 are transferred to the cloud storage 122 and stored as clouddiff objects 142. Thus, the snapdiff object derived from the snapshots 140 are stored as clouddiff objects 142.

The clouddiff objects 142 are then applied to the block devices 128 (e.g., using an import snapshot feature). More specifically, the cloud diff object associated with B 108 (snapdiff BS-t1) is applied to hydrated B and the cloud diff object associated with A 106 (snapdiff AS-t1) is applied to hydrated A 130. The process of applying the clouddiff objects may involve reading the change location(offset) and size and modifying/copying the data from the clouddiff objects 142 to the blocks of the corresponding block devices 128 that are located at the relevant offset.

Once the clouddiff objects 142 are successfully applied, the hydrated A 130 and hydrated B 132 represent the same data in the snapshots 140 (AS-ta and BS-t1) at time t1. In this example, after the snapdiff objects AS-t1 and BS-t1 are applied, the block devices 128 are updated.

Once the block devices 128 are updated, another snapshot is performed on the block devices 128. This may result in the cloud snapshots CAS-t1 144 and CBS-t1 126. Thus, the cloud snapshots CAS-t1 144 and CBS-t1 146 in the cloud snapshots 134 correspond to snapshots AS-t1 and BS-t1 in the local array of snapshots 110.

This is how the snapshots relationships looks like after the second snap at t1

| Local array Snap | Corresponding Cloud Snap | Time of Snap |
|---|---|---|
| AS-t1 | CAS-t1 | t1 |
| BS-t1 | CBS-t1 | t1 |

Subsequent snapshots on the local array 110 are handled in a similar manner. The incremental data reflected in the snapshot AS-tn and BS-tn follow the same approach as for the snapshot at t1. The incremental data (or changes) are captured by querying or generating the snapdiffs from the snapshots at time tn and t(n−1). The snapdiff and metadata is sent to the cloud and applied to the block devices. A cloud snapshot is then obtained from the block devices, which are remote volumes relative to the client system in one example. Thus, the cloud snapshots correspond to the snapshots in the local array. These cloud snapshots are fully hydrated and ready to use and no conversion or any data modification is required before attaching them to the compute instances.

Figure 2:
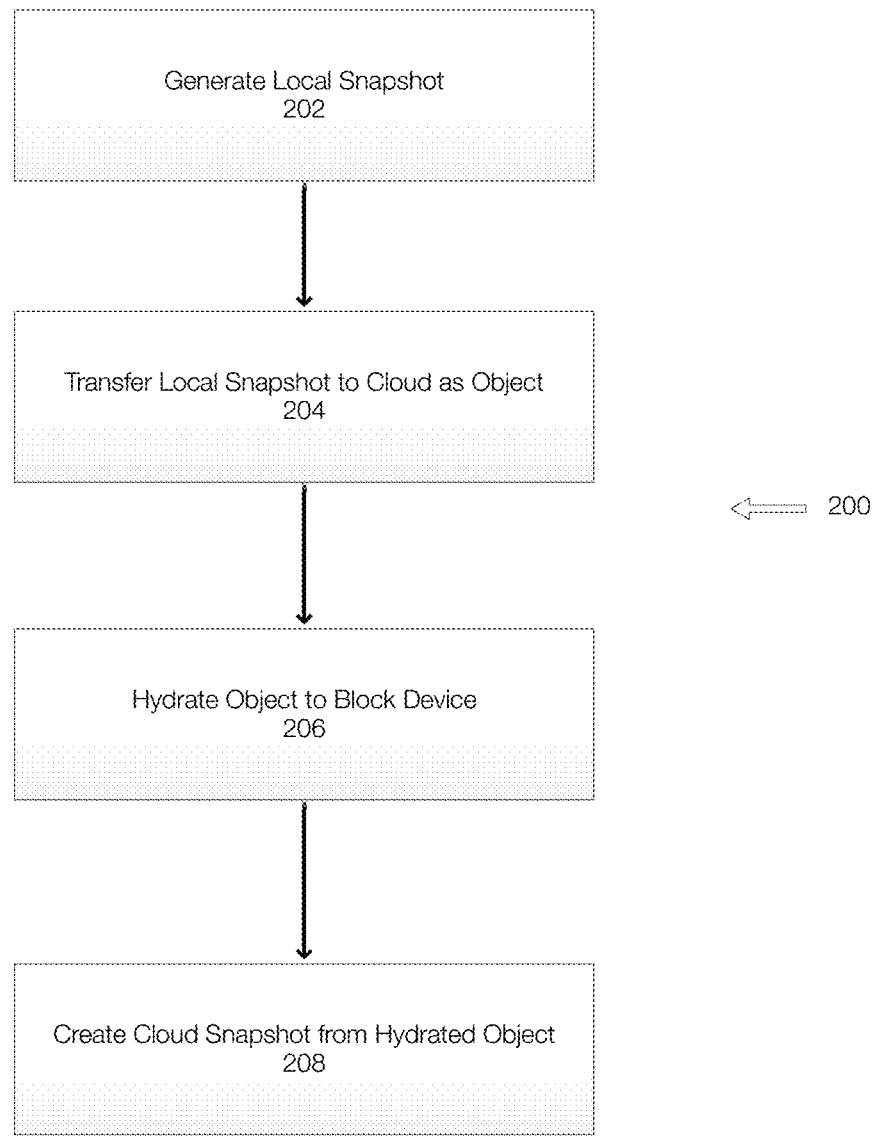
FIG. 2 is an example flow diagram of a method for synthesizing cloud snapshots from local snapshots.

FIG. 2 is an example of a flow diagram illustrating a method for synthesizing a cloud snapshot. The synthesized cloud snapshot is not, in one example, a snapshot of production data, but is a snapshot that is synthesized from existing snapshots.

The method 200 often beings by generating 202 a local snapshot of production data. Production data may include data including logs or the like, an application, an application and its data, or the like. The production data may be on-Si premise (local), cloud based, virtualized, or the like or combination thereof. The local snapshots are stored in a local array. In one example, the local array may be a cloud based array. Thus embodiments of the invention may synthesize a snapshot from other cloud snapshots.

Generating 202 a local snapshot may also include generating a snapdiff. A snapdiff is generated when it is no longer necessary to transfer a full snapshot. In one example, the snapdiff includes the changes that occur from one snapshot to the next. In a comparison between a snapshot at time tn and a snapshot at time t(n−1), some of the data may be the same and some of the data may be different. The data that is different or has changed in the snapshot at time tn is identified and included in a snapdiff. The snapdiff may include metadata (e.g., size and location) that will allow the snapdiff to be applied to the hydrated data in the cloud.

The snapshot (and/or snapdiff) is then transferred 204 to cloud storage as an object. In one example, an object is generated from the snapshot. This may include preparing the snapshot for transport by compressing and/or encrypting the snapshot. The object may also include other metadata or formatting that is associated with a backup application or the like. Typically, objects are suitable for restoring the production data if necessary, but may not be suitable for other purposes. Once the object is prepared, the object is transmitted to the cloud and stored as an object in a bucket or store. The object may also represent a disk image. The snapdiff may or may not be represented as a disk image. The snapdiff, however, can be compressed and/or encrypted.

Next, the objects are hydrated 206 to a block device. In the cloud, a block device may be allocated that corresponds in size to the volume on which the original data is stored. This facilitates hydration of the object to the block device. The object can be imported to the block device when the object corresponds to a full snapshot. Alternatively, the changes in a snapdiff can be applied to the block device using the associated metadata. The associated metadata identifies, for example, an offset and a size. This allows the data on the block device to be updated as needed.

Once the block device is updated from the most recent object, the block device corresponds to one of the snapshots of the local production data.

Finally, a cloud snapshot is taken 208 of the block device. This process results in a fully hydrated cloud snapshot or series of snapshot that are identical to, respectively, snapshots in a local array. In addition, the synthesized cloud snapshots can be used for disaster recover, testing, development or the like.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for synthesizing a cloud snapshot, the method comprising:
    generating a snapshot of production data and storing the snapshot on a storage device;
    converting the snapshot to a raw disk image;
    transferring the raw disk image to cloud storage, wherein the raw disk image is stored in the cloud storage as an object;
    hydrating the object to a block device in the cloud;
    creating a snapshot from the hydrated object to create a cloud snapshot, wherein the cloud snapshot corresponds to the snapshot on the storage device; and
    generating a second cloud snapshot that corresponds to a second generated snapshot on the storage device by applying a snapdiff object that is generated to include differences between the second snapshot on the storage device and the snapshot on the storage device,
    wherein the cloud snapshot and the second cloud snapshot are configured for attachment to a compute instance without further conversion or data modification.

2. The method according to claim 1, further comprising compressing and/or encrypting the snapshot before transferring the snapshot to the cloud storage.

3. The method according to claim 1, wherein hydrating the object to a block device includes importing the object to the block device using a snapshot import feature.

4. The method according to claim 1, further comprising connecting the cloud snapshot to a compute instance.

5. The method according to claim 1, further comprising storing the changes between the second snapshot and the snapshot in the snapdiff object.

6. The method according to claim 5, further comprising transferring the snapdiff object to the cloud storage.

7. The method according to claim 6, wherein applying the snapdiff object comprises applying the changes in the snapdiff object to the block device.

8. The method according to claim 7, further comprising taking a second cloud snapshot of the block device after the snapdiff object has been applied to the block device.

9. The method according to claim 1, wherein the production data comprises data, an application, or data and an application.

10. A method for synthesizing a cloud snapshot, the method comprising:
    generating a snapshot of production data and storing the snapshot on a storage device, wherein the production data are stored on a volume;
    converting the snapshot to a raw disk image;
    transferring the raw disk image to cloud storage, wherein the raw disk image is stored in the cloud storage as an object;
    importing the object to a block device, wherein a configuration of the block device is the same as the volume on which the data is stored;
    creating a snapshot of the data on the block device to create a cloud snapshot, wherein the cloud snapshot corresponds to the snapshot on the storage device;
    updating the block device based on changes stored in subsequent snapshots on the storage device, wherein at least some of the subsequent snapshots includes only changes from a previous snapshot; and
    creating subsequent cloud snapshots of the updated block device, wherein the subsequent cloud snapshots correspond to the subsequent snapshots on the storage device, wherein the cloud snapshot and the subsequent cloud snapshots are configured for attachment to a compute instance without further conversion or data modification.

11. The method according to claim 10, further comprising compressing and/or encrypting the snapshot and the subsequent snapshots before transferring the snapshot and the subsequent snapshots to the cloud storage.

12. The method according to claim 10, wherein importing the object includes hydrating the object the block device using a snapshot import feature.

13. The method according to claim 10, further comprising connecting the cloud snapshot to a compute instance.

14. The method according to claim 10, further comprising generating a metadata file, wherein the metadata file includes changes from one of the snapshots to another of the snapshots.

15. The method according to claim 14, wherein the metadata file identifies locations of changes and sizes of the changes.

16. The method according to claim 15, wherein each of the subsequent snapshots is associated with a corresponding metadata file.

17. The method according to claim 14, wherein updating the block device includes applying the changes associated with a metadata file to the block device.

18. The method according to claim 14, further comprising storing the changes in a snapdiff object.

19. The method according to claim 10, wherein the production data comprises data, an application, or data and an application.

* * * * *